(12) United States Patent
Crowley et al.

(10) Patent No.: US 12,140,083 B2
(45) Date of Patent: *Nov. 12, 2024

(54) ADAPTIVE MODEL PREDICTIVE CONTROL FOR HYBRID ELECTRIC PROPULSION

(71) Applicant: RTX Corporation, Farmington, CT (US)

(72) Inventors: Timothy J. Crowley, Tolland, CT (US); Sorin Bengea, Glastonbury, CT (US); Manuj Dhingra, Glastonbury, CT (US); David Gelwan, West Hartford, CT (US); Kevin Hendricks, Vernon, CT (US); Joshua Adams, New Hartford, CT (US); Martin Richard Amari, Glastonbury, CT (US); Richard P. Meisner, Glastonbury, CT (US); David Lei Ma, Avon, CT (US)

(73) Assignee: RTX CORPORATION, Farmington, CT (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/153,487

(22) Filed: Jan. 12, 2023

(65) Prior Publication Data

US 2023/0160347 A1    May 25, 2023

Related U.S. Application Data

(63) Continuation of application No. 16/783,512, filed on Feb. 6, 2020, now Pat. No. 11,555,455.

(Continued)

(51) Int. Cl.
*F02C 9/00*    (2006.01)
*B64D 27/02*    (2006.01)

(52) U.S. Cl.
CPC ............. *F02C 9/00* (2013.01); *B64D 27/02* (2013.01); *B64D 27/026* (2024.01);
(Continued)

(58) Field of Classification Search
None
See application file for complete search history.

(56) References Cited

U.S. PATENT DOCUMENTS 10,156,197 B1    12/2018    Jin et al.
2004/0102890 A1    5/2004    Brunell
(Continued)

FOREIGN PATENT DOCUMENTS

EP    3421935 A1    1/2019
WO    2014158240 A3    10/2014

OTHER PUBLICATIONS

EP Application No. 20155575.2 Extended EP Search Report dated Jun. 15, 2020, 6 pages.

*Primary Examiner* — Jason H Duger
(74) *Attorney, Agent, or Firm* — CANTOR COLBURN LLP (57) ABSTRACT

A hybrid electric propulsion system includes a gas turbine engine having at least one compressor section and at least one turbine section operably coupled to a shaft. The hybrid electric propulsion system includes an electric motor configured to augment rotational power of the shaft of the gas turbine engine. A controller is operable to determine hybrid electric propulsion system parameters based on a composite system model and sensor data, determine a prediction based on the hybrid electric propulsion system parameters and the composite system model, determine a model predictive control optimization for a plurality of hybrid electric system control effectors based on the prediction using a plurality of reduced-order partitions of the composite system model, and (Continued)

actuate the hybrid electric system control effectors based on the model predictive control optimization.

18 Claims, 7 Drawing Sheets

Related U.S. Application Data (60) Provisional application No. 62/802,263, filed on Feb. 7, 2019.

(52) U.S. Cl.
CPC .... *F05D 2220/323* (2013.01); *F05D 2220/76* (2013.01); *F05D 2240/60* (2013.01); *F05D 2260/80* (2013.01); *F05D 2270/09* (2013.01); *F05D 2270/20* (2013.01); *F05D 2270/44* (2013.01); *F05D 2270/80* (2013.01)

(56) References Cited

U.S. PATENT DOCUMENTS

| | | |
|---|---|---|
| 2008/0178600 A1 | 7/2008 | Healy et al. |
| 2008/0243352 A1 | 10/2008 | Healy |
| 2009/0173078 A1 | 7/2009 | Thatcher et al. |
| 2012/0060505 A1* | 3/2012 | Fuller ................ G05B 13/00 60/773 |
| 2013/0073170 A1 | 3/2013 | Drohan et al. |
| 2014/0005909 A1* | 1/2014 | Meisner ................ F02C 9/00 701/100 |
| 2014/0121847 A1 | 5/2014 | Seely et al. |
| 2014/0271117 A1* | 9/2014 | Armstrong ............ F01D 21/12 415/13 |
| 2015/0367950 A1* | 12/2015 | Rajashekara .......... B64D 27/10 903/930 |
| 2018/0363580 A1 | 12/2018 | Jin et al. |
| 2020/0290742 A1* | 9/2020 | Kumar ................ B64D 27/24 |
| 2020/0347787 A1 | 11/2020 | Crowley et al. |

* cited by examiner

ADAPTIVE MODEL PREDICTIVE CONTROL FOR HYBRID ELECTRIC PROPULSION

CROSS-REFERENCE TO RELATED APPLICATION

This application is a continuation application of U.S. application Ser. No. 16/783,512 filed Feb. 6, 2020, which claims the benefit of priority to U.S. Provisional Application No. 62/802,263 filed Feb. 7, 2019, the disclosures of which are incorporated herein by reference in their entirety.

BACKGROUND

The subject matter disclosed herein generally relates to rotating machinery and, more particularly, to a method and an apparatus for model predictive control for hybrid electric propulsion.

A hybrid electric propulsion system for an aircraft can include a gas turbine engine and at least one electric motor that supplements performance of the gas turbine engine. Gas turbine engines and electric motors typically have separate control laws to manage gas turbine power and electric power. Separate control laws can increase challenges in effectively managing events, such as rapid transients, thermal-mechanical stress, component lifespan, and/or other control goals.

BRIEF DESCRIPTION

According to one embodiment, a hybrid electric propulsion system includes a gas turbine engine having at least one compressor section and at least one turbine section operably coupled to a shaft. The hybrid electric propulsion system includes an electric motor configured to augment rotational power of the shaft of the gas turbine engine. A controller is operable to determine hybrid electric propulsion system parameters based on a composite system model and sensor data from one or more sensors, determine a prediction based on the hybrid electric propulsion system parameters and the composite system model, determine a model predictive control optimization for a plurality of hybrid electric system control effectors based on the prediction using a plurality of reduced-order partitions of the composite system model, and actuate the hybrid electric system control effectors based on the model predictive control optimization.

In addition to one or more of the features described above or below, or as an alternative, further embodiments may include where the controller is further configured to update a plurality of composite system model states of the composite system model based on detection of one or more faults.

In addition to one or more of the features described above or below, or as an alternative, further embodiments may include where the controller is further configured to update one or more reduced-order values based on the reduced-order partitions of the composite system model states of the composite system model.

In addition to one or more of the features described above or below, or as an alternative, further embodiments may include where the one or more reduced-order values are reduced-order Jacobian values based on a plurality of Jacobian equations associated with the composite system model.

In addition to one or more of the features described above or below, or as an alternative, further embodiments may include where the reduced-order partitions include partitions of a propulsion system model including a gas turbine engine model, a mechanical power transmission model, and an electrical power system model that preserve a plurality of dominant states for each partition.

In addition to one or more of the features described above or below, or as an alternative, further embodiments may include where the composite system model includes the propulsion system model, an optimization objective function, and a plurality of constraints.

In addition to one or more of the features described above or below, or as an alternative, further embodiments may include where the Jacobian equations associated with the composite system model include a plurality of model sensitivity matrices that are updated based on the detection of one or more faults.

In addition to one or more of the features described above or below, or as an alternative, further embodiments may include where the model predictive control optimization uses the model sensitivity matrices to determine a set of changes to the hybrid electric system control effectors that optimizes the optimization objective function over a finite time horizon while maintaining the constraints.

In addition to one or more of the features described above or below, or as an alternative, further embodiments may include an electric generator configured to extract power from the shaft, wherein the composite system model includes a plurality of electrical and mechanical physics-based models of at least the gas turbine engine, the electric motor, the electric generator, and one or more mechanical power transmissions.

According to an embodiment, a hybrid electric propulsion system includes a gas turbine engine, an electrical power system, a mechanical power transmission operably coupled between the gas turbine engine and the electrical power system, a plurality of hybrid electric system control effectors operable to control a plurality of states of one or more the gas turbine engine and the electrical power system, and means for controlling the hybrid electric system control effectors based on a model predictive control that is dynamically updated during operation of the hybrid electric propulsion system.

In addition to one or more of the features described above or below, or as an alternative, further embodiments may include where the means for controlling the hybrid electric system control effectors includes a controller operable to determine a plurality of hybrid electric propulsion system parameters based on a composite system model and a plurality of sensor data from one or more sensors, determine a prediction based on the hybrid electric propulsion system parameters and the composite system model, determine a model predictive control optimization for the hybrid electric system control effectors based on the prediction using a plurality of reduced-order partitions of the composite system model, and actuate the hybrid electric system control effectors based on the model predictive control optimization.

According to an embodiment, a method for controlling a hybrid electric propulsion system includes determining, by a controller, a plurality of hybrid electric propulsion system parameters based on a composite system model and a plurality of sensor data from one or more sensors, determining, by the controller, a prediction based on the hybrid electric propulsion system parameters and the composite system model, determining, by the controller, a model predictive control optimization for a plurality of hybrid electric system control effectors based on the prediction using a plurality of reduced-order partitions of the composite system model, and actuating, by the controller, the hybrid electric system control effectors based on the model predictive control optimization.

A technical effect of the apparatus, systems and methods is achieved by performing model predictive control for a hybrid electric propulsion system.

BRIEF DESCRIPTION OF THE DRAWINGS

The following descriptions should not be considered limiting in any way. With reference to the accompanying drawings, like elements are numbered alike.

DETAILED DESCRIPTION

A detailed description of one or more embodiments of the disclosed apparatus and method are presented herein by way of exemplification and not limitation with reference to the Figures.

Figure 1:
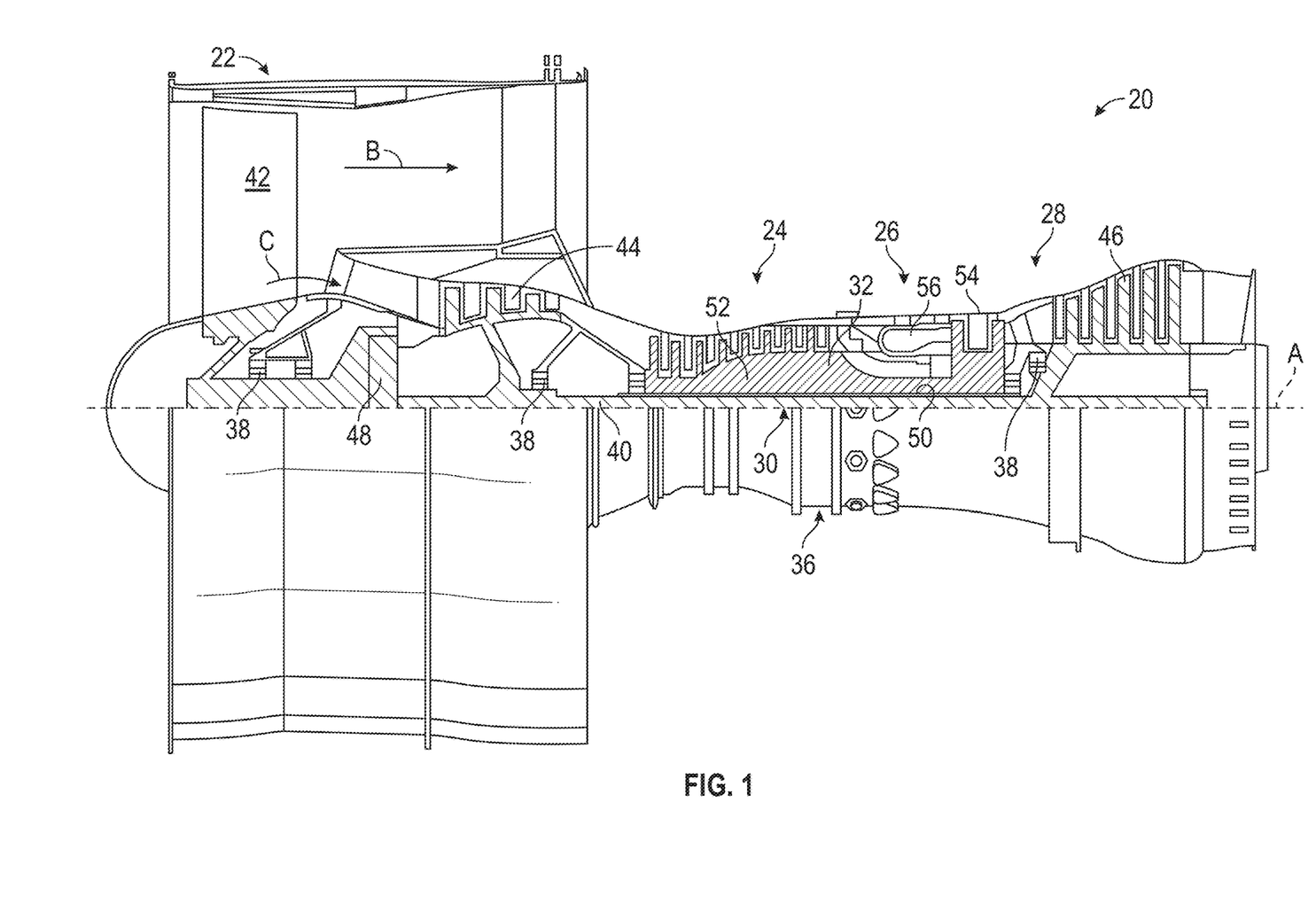
FIG. 1 is a partial cross-sectional illustration of a gas turbine engine, in accordance with an embodiment of the disclosure.

FIG. 1 schematically illustrates a gas turbine engine 20. The gas turbine engine 20 is disclosed herein as a two-spool turbofan that generally incorporates a fan section 22, a compressor section 24, a combustor section 26 and a turbine section 28. The fan section 22 drives air along a bypass flow path B in a bypass duct, while the compressor section 24 drives air along a core flow path C for compression and communication into the combustor section 26 then expansion through the turbine section 28. Although depicted as a two-spool turbofan gas turbine engine in the disclosed non-limiting embodiment, it should be understood that the concepts described herein are not limited to use with two-spool turbofans as the teachings may be applied to other types of turbine engines including three-spool architectures.

The exemplary engine 20 generally includes a low speed spool 30 and a high speed spool 32 mounted for rotation about an engine central longitudinal axis A relative to an engine static structure 36 via several bearing systems 38. It should be understood that various bearing systems 38 at various locations may alternatively or additionally be provided, and the location of bearing systems 38 may be varied as appropriate to the application.

The low speed spool 30 generally includes an inner shaft 40 that interconnects a fan 42, a low pressure compressor 44 and a low pressure turbine 46. The inner shaft 40 is connected to the fan 42 through a speed change mechanism, which in exemplary gas turbine engine 20 is illustrated as a geared architecture 48 to drive the fan 42 at a lower speed than the low speed spool 30. The high speed spool 32 includes an outer shaft 50 that interconnects a high pressure compressor 52 and high pressure turbine 54. A combustor 56 is arranged in exemplary gas turbine 20 between the high pressure compressor 52 and the high pressure turbine 54. An engine static structure 36 is arranged generally between the high pressure turbine 54 and the low pressure turbine 46. The engine static structure 36 further supports bearing systems 38 in the turbine section 28. The inner shaft 40 and the outer shaft 50 are concentric and rotate via bearing systems 38 about the engine central longitudinal axis A which is collinear with their longitudinal axes.

The core airflow is compressed by the low pressure compressor 44 then the high pressure compressor 52, mixed and burned with fuel in the combustor 56, then expanded over the high pressure turbine 54 and low pressure turbine 46. The turbines 46, 54 rotationally drive the respective low speed spool 30 and high speed spool 32 in response to the expansion. It will be appreciated that each of the positions of the fan section 22, compressor section 24, combustor section 26, turbine section 28, and fan drive gear system 48 may be varied. For example, gear system 48 may be located aft of combustor section 26 or even aft of turbine section 28, and fan section 22 may be positioned forward or aft of the location of gear system 48.

The engine 20 in one example is a high-bypass geared aircraft engine. In a further example, the engine 20 bypass ratio is greater than about six (6), with an example embodiment being greater than about ten (10), the geared architecture 48 is an epicyclic gear train, such as a planetary gear system or other gear system, with a gear reduction ratio of greater than about 2.3 and the low pressure turbine 46 has a pressure ratio that is greater than about five. In one disclosed embodiment, the engine 20 bypass ratio is greater than about ten (10:1), the fan diameter is significantly larger than that of the low pressure compressor 44, and the low pressure turbine 46 has a pressure ratio that is greater than about five 5:1. Low pressure turbine 46 pressure ratio is pressure measured prior to inlet of low pressure turbine 46 as related to the pressure at the outlet of the low pressure turbine 46 prior to an exhaust nozzle. The geared architecture 48 may be an epicycle gear train, such as a planetary gear system or other gear system, with a gear reduction ratio of greater than about 2.3:1. It should be understood, however, that the above parameters are only exemplary of one embodiment of a geared architecture engine and that the present disclosure is applicable to other gas turbine engines including direct drive turbofans.

A significant amount of thrust is provided by the bypass flow B due to the high bypass ratio. The fan section 22 of the engine 20 is designed for a particular flight condition—typically cruise at about 0.8 Mach and about 35,000 feet (10,688 meters). The flight condition of 0.8 Mach and 35,000 ft (10,688 meters), with the engine at its best fuel consumption—also known as "bucket cruise Thrust Specific Fuel Consumption ('TSFC')"—is the industry standard parameter of lbm of fuel being burned divided by lbf of thrust the engine produces at that minimum point. "Low fan pressure ratio" is the pressure ratio across the fan blade alone, without a Fan Exit Guide Vane ("FEGV") system. The low fan pressure ratio as disclosed herein according to one non-limiting embodiment is less than about 1.45. "Low corrected fan tip speed" is the actual fan tip speed in ft/sec divided by an industry standard temperature correction of [(Tram °R)/(518.7 °R)]^0.5. The "Low corrected fan tip speed" as disclosed herein according to one non-limiting embodiment is less than about 1150 ft/second (350.5 m/sec).

While the example of FIG. 1 illustrates one example of the gas turbine engine 20, it will be understood that any number of spools, inclusion or omission of the gear system 48, and/or other elements and subsystems are contemplated. Further, rotor systems described herein can be used in a variety of applications and need not be limited to gas turbine engines for aircraft applications. For example, rotor systems can be included in power generation systems, which may be ground-based as a fixed position or mobile system, and other such applications.

Figure 2:
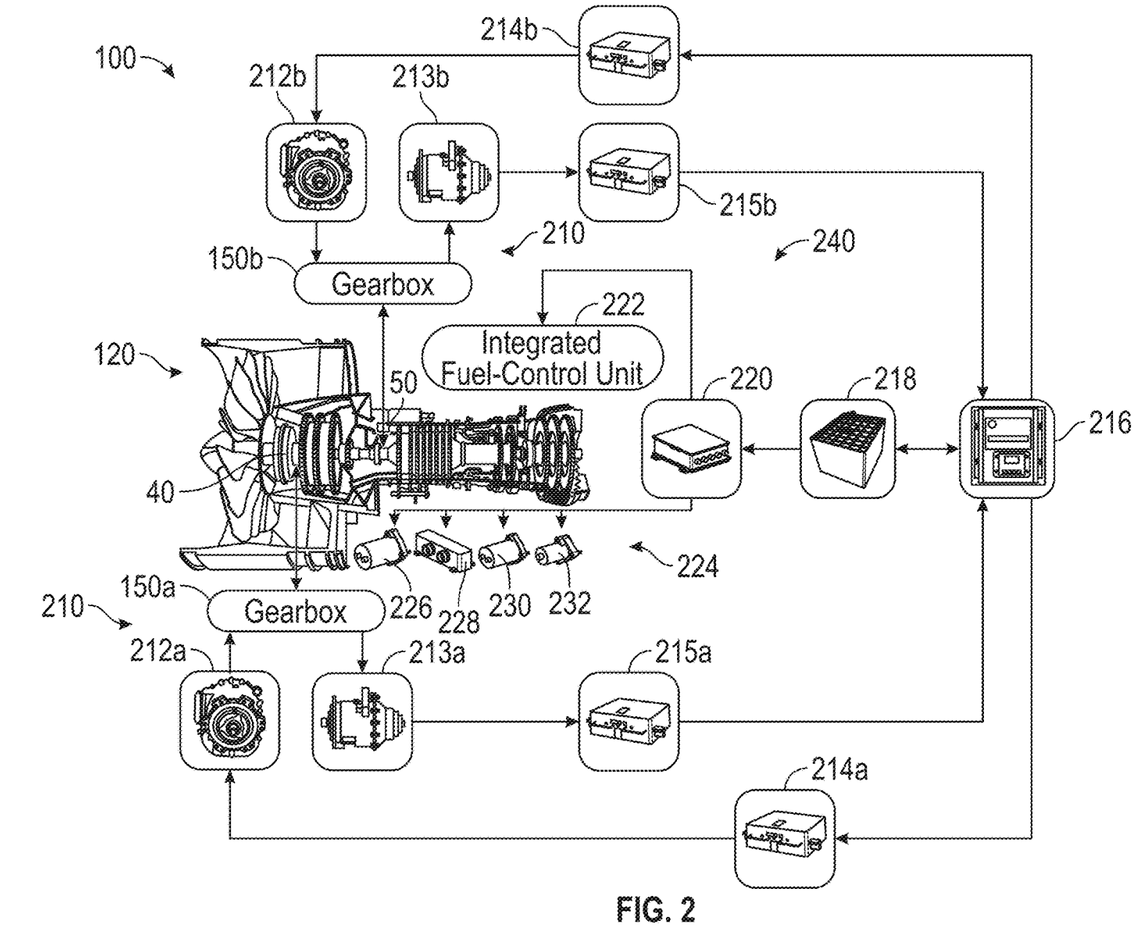
FIG. 2 is a schematic diagram of a hybrid electric propulsion system with physical power flow connections (electrical and mechanical power), in accordance with an embodiment of the disclosure.

FIG. 2 illustrates a hybrid electric propulsion system 100 (also referred to as hybrid gas turbine engine 100) including a gas turbine engine 120 operably coupled to an electrical power system 210 as part of a hybrid electric aircraft. One or more mechanical power transmissions 150 (e.g., 150A, 150B) can be operably coupled between the gas turbine engine 120 and the electrical power system 210. The gas turbine engine 120 can be an embodiment of the gas turbine engine 20 of FIG. 1 and includes one or more spools, such as low speed spool 30 and high speed spool 32, each with at least one compressor section and at least one turbine section operably coupled to a shaft (e.g., low pressure compressor 44 and low pressure turbine 46 coupled to inner shaft 40 and high pressure compressor 52 and high pressure turbine 54 coupled to outer shaft 50 as depicted in FIG. 1). The electrical power system 210 can include a first electric motor 212A configured to augment rotational power of the low speed spool 30 and a second electric motor 212B configured to augment rotational power of the high speed spool 32. Although two electric motors 212A, 212B are depicted in FIG. 2, it will be understood that there may be only a single electric motor or additional electric motors (not depicted). The electrical power system 210 can also include a first electric generator 213A configured to convert rotational power of the low speed spool 30 to electric power and a second electric generator 213B configured to convert rotational power of the high speed spool 32 to electric power. In some embodiments, the electric motors 212A, 212B can be configured as a motor or a generator depending upon an operational mode or system configuration, and thus the electric generators 213A, 213B may be omitted. In the example of FIG. 2, the mechanical power transmission 150A includes a gearbox operably coupled between the inner shaft 40 and a combination of the first electric motor 212A and first electric generator 213A. The mechanical power transmission 150B can include a gearbox operably coupled between the outer shaft 50 and a combination of the second electric motor 212B and second electric generator 213B. In embodiments where the electric motors 212A, 212B are configurable between a motor and generator mode of operation, the mechanical power transmission 150A, 150B can be a clutch or other interfacing element(s).

The electrical power system 210 can also include motor drive electronics 214A, 214B operable to condition current to the electric motors 212A, 212B (e.g., DC-to-AC converters). The electrical power system 210 can also include rectifier electronics 215A. 215B operable to condition current from the electric generators 213A, 213B (e.g., AC-to-DC converters). The motor drive electronics 214A. 214B and rectifier electronics 215A, 215B can interface with an energy storage management system 216 that further interfaces with an energy storage system 218. The energy storage management system 216 can be a bi-directional DC-DC converter that regulates voltages between energy storage system 218 and electronics 214A, 214B. 215A, 215B. The energy storage system 218 can include one or more energy storage devices, such as a battery, a super capacitor, an ultra capacitor, and the like.

A power conditioning unit 220 and/or other components can be powered by the energy storage system 218. The power conditioning unit 220 can distribute electric power to support actuation and other functions of the gas turbine engine 120. For example, the power conditioning unit 220 can power an integrated fuel control unit 222 to control fuel flow to the gas turbine engine 120. The power conditioning unit 220 can power a plurality of actuators 224, such as one or more of a low pressure compressor bleed valve actuator 226, a low pressure compressor vane actuator 228, a high pressure compressor vane actuator 230, an active clearance control actuator 232, and other such effectors. Collectively, any effectors that can change a state of the gas turbine engine 120 and/or the electrical power system 210 may be referred to as hybrid electric system control effectors 240. Examples of the hybrid electric system control effectors 240 can include the electric motors 212A. 212B, electric generators 213A, 213B, integrated fuel control unit 222, actuators 224 and/or other elements (not depicted).

Figure 3:
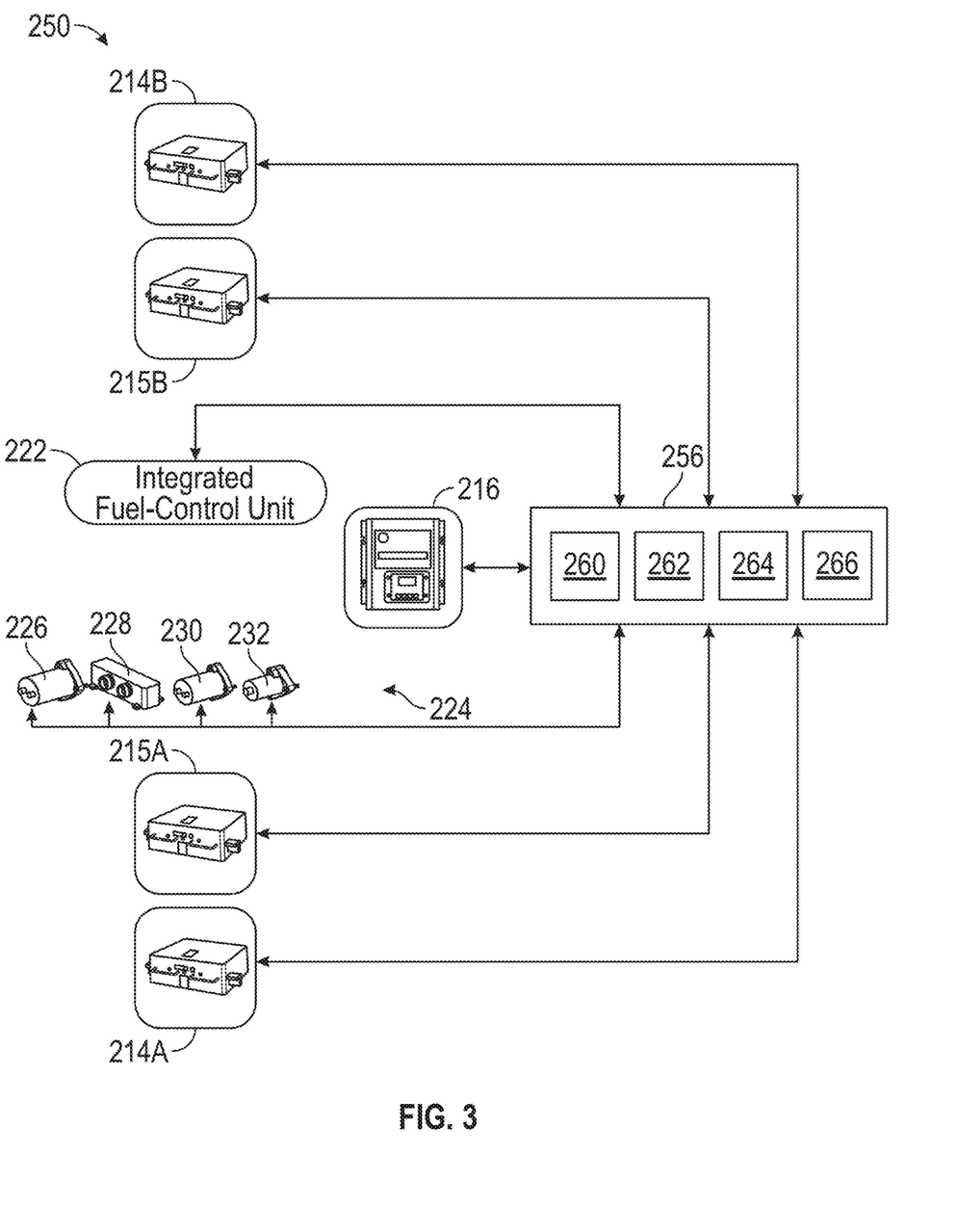
FIG. 3 is a schematic diagram of control signal paths of a hybrid electric propulsion system propulsion system, in accordance with an embodiment of the disclosure.

FIG. 3 is a schematic diagram of control signal paths 250 of the hybrid electric propulsion system 100 of FIG. 2 and is described with continued reference to FIGS. 1 and 2. A controller 256 can interface with the motor drive electronics 214A. 214B, rectifier electronics 215A, 215B, energy storage management system 216, integrated fuel control unit 222, actuators 224, and/or other components (not depicted) of the hybrid electric propulsion system 100. In embodiments, the controller 256 can control and monitor for fault conditions of the gas turbine engine 120 and/or the electrical power system 210. For example, the controller 256 can be integrally formed or otherwise in communication with a full authority digital engine control (FADEC) of the gas turbine engine 120. In embodiments, the controller 256 can include a processing system 260, a memory system 262, and an input/output interface 264. The controller 256 can also include various operational controls, such as a model predictive control 266 that controls the hybrid electric system control effectors 240 as further described herein.

The processing system 260 can include any type or combination of central processing unit (CPU), including one or more of: a microprocessor, a digital signal processor (DSP), a microcontroller, an application specific integrated circuit (ASIC), a field programmable gate array (FPGA), or the like. The memory system 262 can store data and instructions that are executed by the processing system 260. In embodiments, the memory system 262 may include random access memory (RAM), read only memory (ROM), or other electronic, optical, magnetic, or any other computer readable medium onto which is stored data and algorithms in a non-transitory form. The input/output interface 264 is configured to collect sensor data from the one or more system sensors (FIG. 4) and interface with various components and subsystems, such as components of the motor drive electronics 214A, 214B, rectifier electronics 215A, 215B, energy storage management system 216, integrated fuel control unit 222, actuators 224, and/or other components (not depicted) of the hybrid electric propulsion system 100. The controller 256 provides a means for controlling the hybrid electric system control effectors 240 based on a model predictive control 266 that is dynamically updated during operation of the hybrid electric propulsion system 100. The means for controlling the hybrid electric system control effectors 240 can be otherwise subdivided, distributed, or combined with other control elements.

Figure 4:
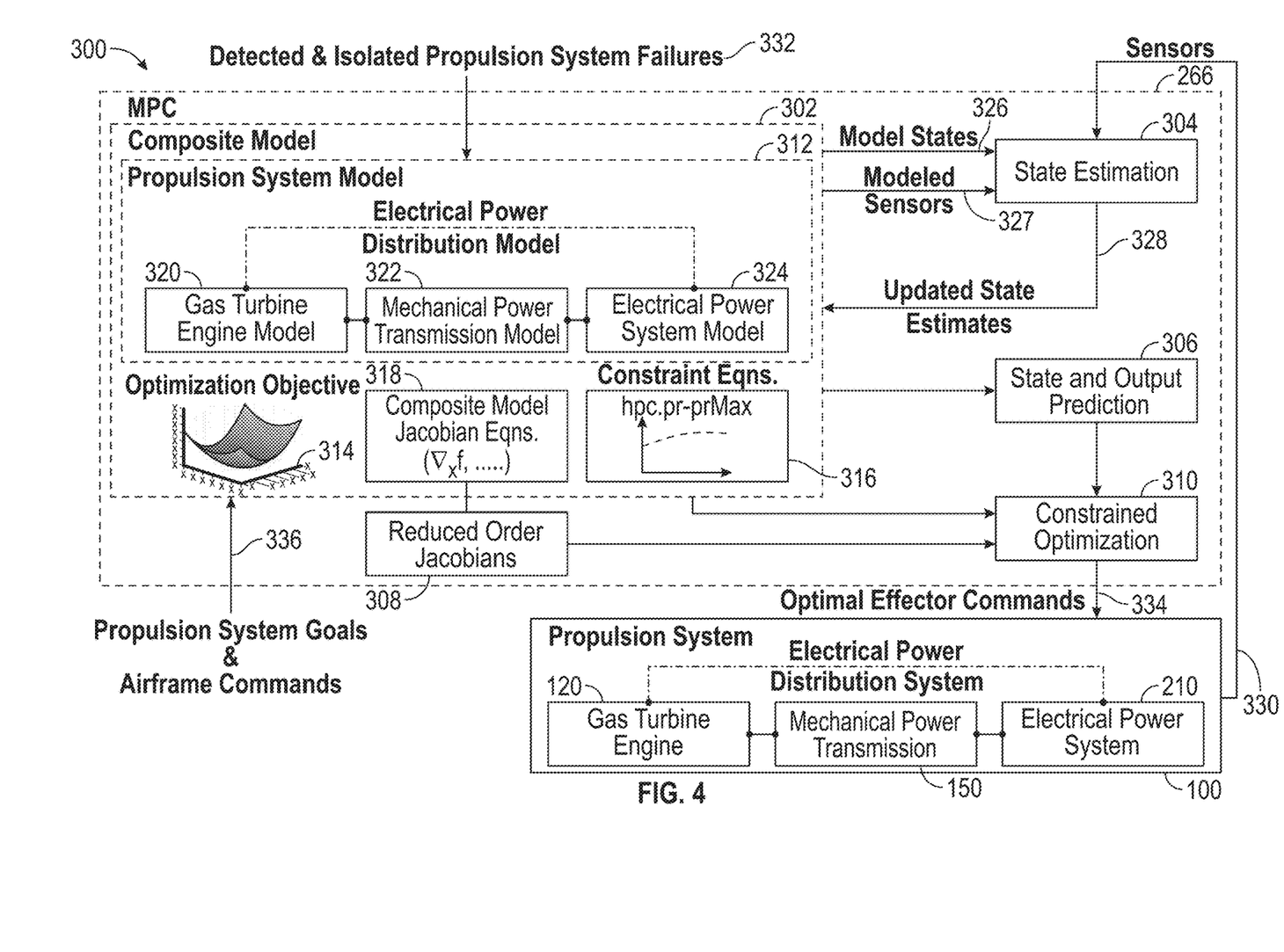
FIG. 4 is a block diagram of a model predictive control system for a hybrid electric propulsion system, in accordance with an embodiment of the disclosure.

Referring now to FIG. 4, a block diagram of a control system 300 is depicted, in accordance with an embodiment of the disclosure. The control system 300 includes the model predictive control 266 that may be embodied within the controller 256 of FIG. 3 and configured to interface with the hybrid electric propulsion system 100. The model predictive control 266 includes a composite system model 302 and computational modules to perform a state estimation 304, state and output prediction 306, determine reduced-order values (e.g., reduced-order Jacobian equations) 308, and constrained optimization 310. The composite system model 302 can include a propulsion system model 312, an optimization objective function 314, a plurality of constraints 316, and Jacobian equations 318 associated with the composite system model 302. The propulsion system model 312 can include a gas turbine engine model 320 of the gas turbine engine 120, a mechanical power transmission model 322 of the mechanical power transmission 150, and an electrical power system model 324 of the electrical power system 210.

The composite system model 302 can provide model states 326, as well as modeled sensor values 327, to state estimation 304 which also receives sensor data from sensors 330 of the hybrid electric propulsion system 100. The state estimation 304 can produce updated state estimates 328, which are provided to update the composite system model 302. In some embodiments, the state estimation block 304 also receives Jacobian values from composite system model 302. These Jacobian values are sensitivities of modeled sensor values 327 to changes in model states 326 and inputs. The Jacobian values are used by the state estimation algorithm within block 304 to compute updated state estimates that align modeled sensor values 327 with the actual sensor data 330. More specifically, in some embodiments, the state estimation algorithm within block 304 is an instance of moving horizon constrained estimation.

From a control architecture perspective, the hybrid electric propulsion system 100 can have multiple potential solutions to achieving a given propulsion system thrust goal. This provides opportunities for real-time optimization of transient and steady-state system performance. For example, the optimization objective function 314 can be configured to use electric power only during rapid accelerations, preserving engine life by lowering peak thermal-mechanical stresses that would otherwise be larger during rapid, fuel-only transients. A control law for this example can smoothly transition from transient electric power-assist to continuous, quasi-steady gas turbine engine supplied power, while maintaining all engine and electric system variables within safe limits as defined in the constraints 316.

Associated with the power distribution challenges, the hybrid electric propulsion system 100 can be significantly more complex than a non-hybrid system, and subject to a larger number of failure modes. The performance advantages realized through hybridization can be accompanied by improvements in control system adaptability and tolerance to failures, such as detected and isolated propulsion system failures 332. The control system embodied in the model predictive control 266 can make a combination of continuous and discrete decisions through predictions over a plurality of future time steps, for instance, to modulate effectors (e.g., fuel, DC motor power) and/or make discrete decisions, such as power provision versus power extraction. In a prediction step, the propulsion system model 312 can be used to predict future responses of the system states and outputs by the state and output prediction 306, which can be based on current values of the hybrid electric system control effectors 240. In a corrector step, the constrained optimization 310 can use model sensitivity matrices (e.g., Jacobian equations 318 reduced as reduced-order values 308) to determine a set of changes to the hybrid electric system control effectors 240 as optimal effector commands 334 that optimize objective function 314, over a finite time horizon, while maintaining the hybrid electric propulsion system 100 within safe limits (e.g., constraints 316). The objectives and constraints may also be functions of current and future system inputs, states, and outputs, thus requiring objective and constraint sensitivities, in addition to model sensitivity matrices, to accurately predict/correct system trajectories and satisfy constraints. For example, in one embodiment, a battery state of charge objective can be a function of the difference of predicted propulsion system thrust and thrust required/requested by an airframe. In another example embodiment, a compressor pressure ratio constraint may be a function of predicted future compressor air flow rate. The sensitivity matrices of the Jacobian equations 318 and further reduced as reduced-order values 308 can be computed during operation of the hybrid electric propulsion system 100 rather than a priori in order to maximize adaptability of model predictive control 266 to failures 332. Propulsion system goals and airframe commands 336 can be updated during operation to change the optimization objective function 314 in order to adapt the model predictive control 266 to changing mission objectives.

For more efficient real-time operation, computational cost of the model predictive control 266 can be reduced by lowering the computational the cost of iteratively computing inverses of the model sensitivity matrices. Therefore, there can be a technical benefit to reducing the size of the sensitivity matrices through state order reduction. In order to splice predictions from a full order model, with optimal corrections computed from reduced order sensitivities, it can be beneficial to retain the identity of physics states in both full and reduced order models. Some hybrid electric propulsion architectures, such as a parallel architecture, have strong but sparse coupling between the aero-thermodynamic propulsion subsystem and the electric power subsystem, through, for example, a gearbox connecting an electric motor to a turbo-machinery shaft. Aside from sparse mechanical coupling points, the remaining and dominant dynamic states of the electrical subsystem (e.g., energy storage system temperature, state of charge) may be largely independent of the dominant dynamic states of the gas turbine engine subsystem. This structure of a dynamic model can be characterized as a sparse and nearly block-diagonal structure that can help inform selection of dynamic states for reduced order Jacobians and potentially can leverage efficient sparse matrix algorithms.

In embodiments, the propulsion system model 312 represents a multi-physics model including aero-thermodynamic, mechanical, and electrical dynamics. State partitioning of the propulsion system model 312 can preserve a quasi-block diagonal structure. A reduced order set of dominant dynamic states for each partition can be determined that preserves state physical identity. The selected reduced order states are used to compute reduced order Jacobians 308 from analytic Jacobian equations of the composite system model 318. The reduced-order Jacobian values 308 are then provided to the constrained optimization 310, which computes optimal effector commands given a set of propulsion system goal and airframe commands 336, objectives 314 and constraints 316, and current estimated state of the engine 328.

Figure 5:
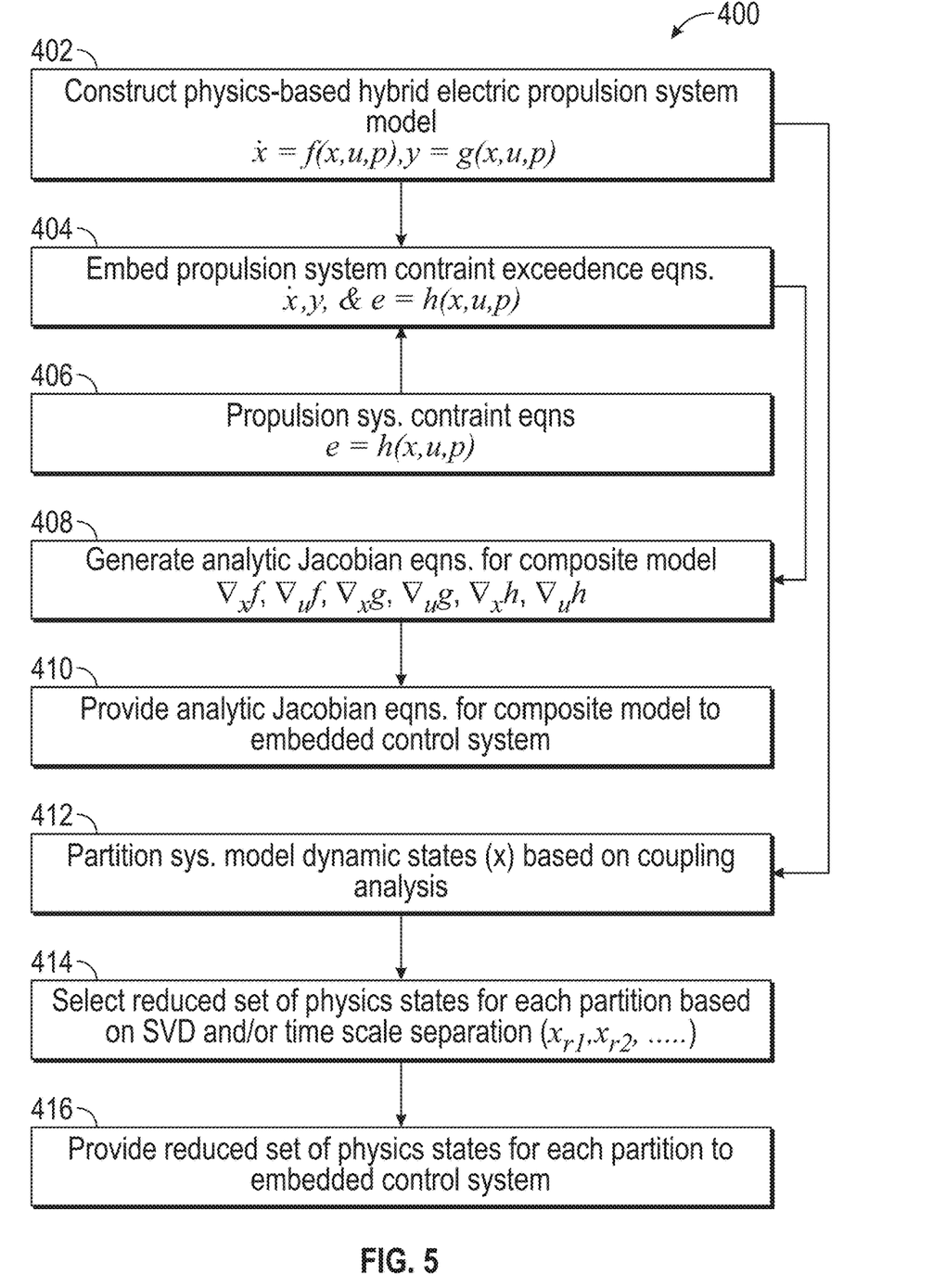
FIG. 5 is a flow chart illustrating a method, in accordance with an embodiment of the disclosure.

Referring now to FIG. 5 with continued reference to FIGS. 1-4, FIG. 5 is a flow chart illustrating a method 400 for off-board modeling and analysis, in accordance with an embodiment. The method 400 may be performed, for example, by a computer system external to the hybrid electric propulsion system 100 to construct a composite propulsion system model 302, generate analytic Jacobian equations 318 for the composite system model, and select a set of reduced order model states for reduced order Jacobians 308 for the model predictive control 266 of FIG. 4. For purposes of explanation, the method 400 is described primarily with respect to the hybrid electric propulsion system 100 of FIG. 2; however, it will be understood that the method 400 can be performed with respect to other configurations (not depicted).

At block 402, a physics-based hybrid electric propulsion system model is constructed that corresponds to design characteristics of the hybrid electric propulsion system 100, as an initial configuration of the propulsion system model 312. At block 404, propulsion system constraint exceedance equations can be determined based on propulsion system constraint equations 406 to determine values for the constraints 316. At block 408, analytic Jacobian equations are generated for the composite system model 302 and implemented as software in the target controller 256 as the Jacobian equations 318, which can include first-order partial derivatives for a collection of dynamic states, adjustments, goals, limits, and the like. At block 410, the analytical Jacobian equations for the composite system model 302 can be loaded as the Jacobian equations 318 into the controller 256. At block 412, the physics-based hybrid electric propulsion system model of block 402 can be partitioned in dynamic states based on a coupling analysis. At block 414, a reduced set of physics states can be selected for each partition based on singular value analysis and time scale separation. At block 416, the reduced set of physics states for each partition can be provided as a set of state indices to load in the controller 256 for producing the reduced-order values 308.

Figure 6:
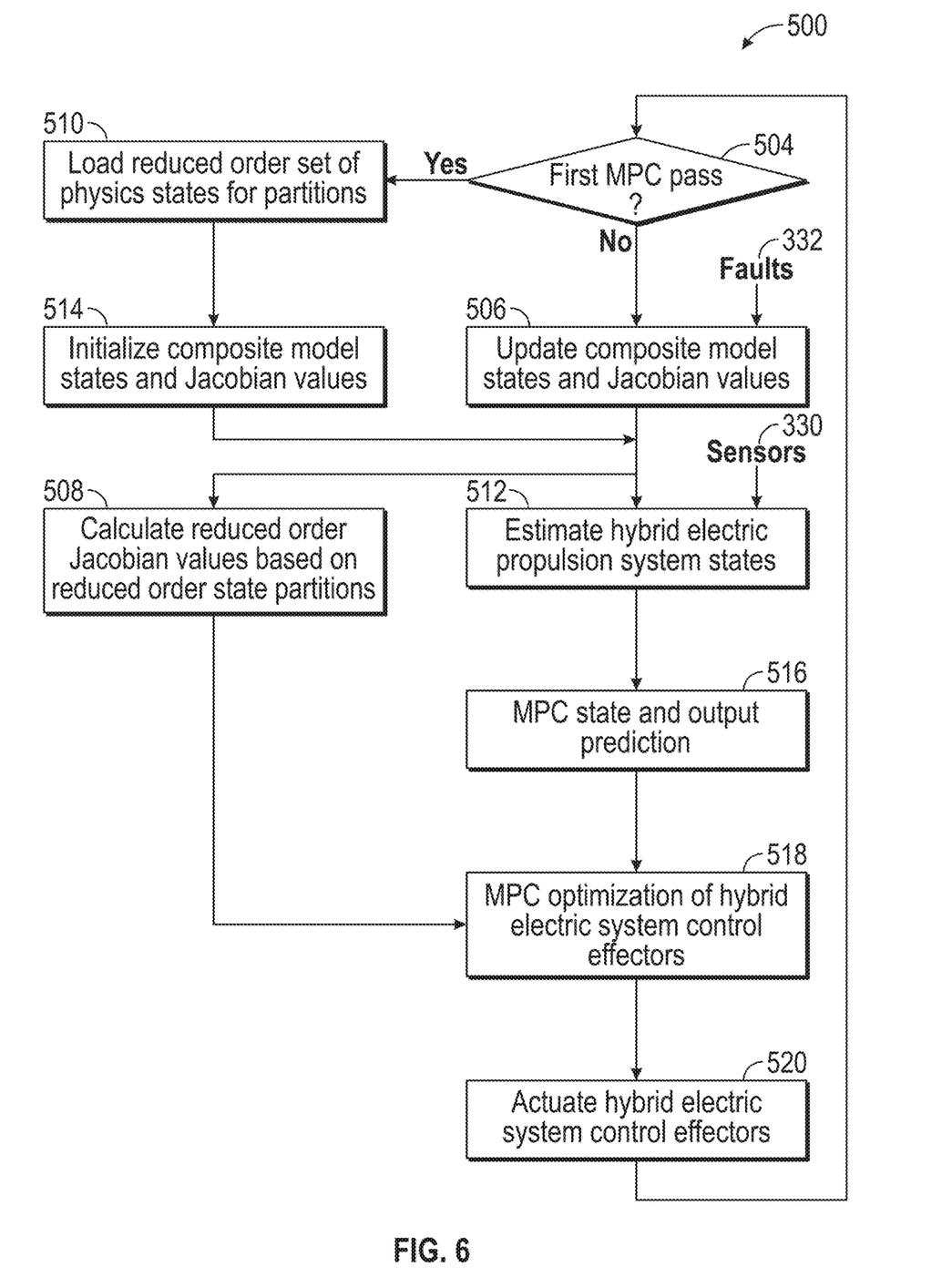
FIG. 6 is a flow chart illustrating a method, in accordance with an embodiment of the disclosure.

Referring now to FIG. 6 with continued reference to FIGS. 1-5, FIG. 6 is a flow chart illustrating a method 500 for controlling of a hybrid electric propulsion system, in accordance with an embodiment. The method 500 may be performed, for example, by the hybrid electric propulsion system 100 of FIG. 2. For purposes of explanation, the method 500 is described primarily with respect to the hybrid electric propulsion system 100 of FIG. 2; however, it will be understood that the method 500 can be performed on other configurations (not depicted).

Method 500 pertains to the controller 256 executing embedded code for the model predictive control 266 to compute optimal hybrid propulsion system control effectors 518 and actuate these effectors 520. At block 504, it can be determined whether this is the first pass of the model predictive control 266. If this is not the first pass, then at block 506, the model states 326 are calculated from last pass model state values, by numerical integration of differential equations 402, 404 of the composite system model 302, within the controller 266. Block 506 also calculates Jacobians 318. The composite system model 302, represented in part by differential equations 402, 404, and the corresponding Jacobians 318, are adaptive to detected failure states 332. For example, a detected open circuit failure of motor drives 214A or 214B triggers a structural and/or parametric change to the composite system model 302 and corresponding Jacobians 318, reflecting physics of the failure state. Model state values from block 506 are used to calculate reduced order Jacobian values in block 508. Block 512 receives the model states from block 506 and computes updated state estimates 328, based on modeled sensor values 327 and propulsion system sensor data 330. At block 508, the controller 256 can calculate the reduced-order values 308 (e.g., reduced-order Jacobian values) based on reduced order partitions defined by a reduced order set of physics states. Indices for the reduced order set of physics states are set in controller 256 at initialization, as defined in block 416 of FIG. 5 and block 510 of FIG. 6. At block 512, the controller 256 can determine an estimate of hybrid electric propulsion system states based on sensor data from sensors 330 and modeled sensor values 327 and model states 326 of the composite system model 302. Initialization 514 of the composite system model 302 can be performed on the first pass of the model predictive control 266

At block 516, the controller 256 can execute the model predictive control 266 to determine the state and output prediction 306. At block 518, the controller 256 can execute the model predictive control 266 to determine the constrained optimization 310 for optimal effector commands 334 of the hybrid electric system control effectors 240 based on the reduced-order Jacobian values 308 of block 508. At block 520, the hybrid electric system control effectors 240 can be actuated based on the optimal effector commands 334. The method 500 can loop back to block 504 to continue with real-time control and updates as the hybrid electric propulsion system 100 operates.

Figure 7:
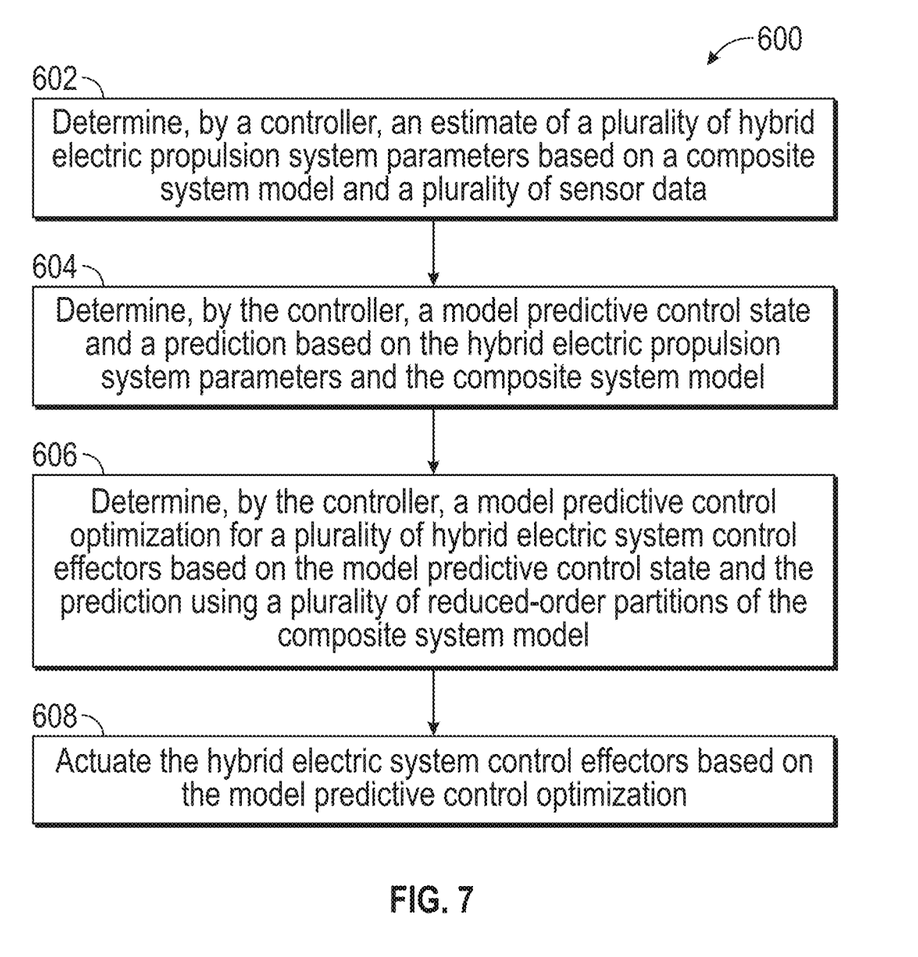
FIG. 7 is a flow chart illustrating a method, in accordance with an embodiment of the disclosure.

Referring now to FIG. 7 with continued reference to FIGS. 1-6, FIG. 7 is a flow chart illustrating a method 600 for control of a hybrid electric propulsion system, in accordance with an embodiment. The method 600 may be performed, for example, by the hybrid electric propulsion system 100 of FIG. 2. For purposes of explanation, the method 600 is described primarily with respect to the hybrid electric propulsion system 100 of FIG. 2; however, it will be understood that the method 600 can be performed on other configurations (not depicted).

At block 602, controller 256 can determine an estimate of a plurality of hybrid electric propulsion system parameters based on a composite system model 302 and a plurality of sensor data from sensors 330 using the state estimation 304. At block 604, the controller 256 can determine a model predictive control state and a prediction using the state and output prediction 306 based on the hybrid electric propulsion system parameters and the composite system model 302. At block 606, the controller 256 can determine a model predictive control optimization for a plurality of hybrid electric system control effectors 240 by the constrained optimization 310 based on the model predictive control state and the prediction using a plurality of reduced-order partitions of the composite system model 302. At block 608, the controller 256 can actuate the hybrid electric system control effectors 240 based on the model predictive control optimization.

In embodiments, the controller 256 can be configured to update a plurality of composite system model states of the composite system model 302 based on detection of one or more faults, such as detected and isolated propulsion system failures 332. The controller 256 can be further configured to update one or more reduced-order values 308 based on the reduced-order partitions of the composite system model states of the composite system model 302. The one or more reduced-order values 308 can be reduced-order Jacobian values based on a plurality of Jacobian equations 318 associated with the composite system model 302. The reduced-order partitions can include partitions of a propulsion system model 312 including a gas turbine engine model 320, a mechanical power transmission model 322, and an electrical power system model 324 that preserve a plurality of dominant states for each partition. The composite system model 302 can include the propulsion system model 312, an optimization objective function 314, and a plurality of constraints 316. The Jacobian equations 318 associated with the composite system model 302 can include a plurality of model sensitivity matrices that are updated based on the detection of one or more faults. The model predictive control optimization can use the model sensitivity matrices to determine a set of changes to the hybrid electric system control effectors 240 that optimizes the optimization objective function 314 over a finite time horizon while maintaining the constraints 316.

While the above description has described the flow process of FIG. 7 in a particular order, it should be appreciated that unless otherwise specifically required in the attached claims that the ordering of the steps may be varied. Also, it is clear to one of ordinary skill in the art that, the stability enhancement provided by the dynamic torque and power capability of the coupled electric motor system described herein can be combined with and enhance other surge control features, such as surge control valves, variable stators, and fuel flow control.

The term "about" is intended to include the degree of error associated with measurement of the particular quantity based upon the equipment available at the time of filing the application.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

While the present disclosure has been described with reference to an exemplary embodiment or embodiments, it will be understood by those skilled in the art that various changes may be made and equivalents may be substituted for elements thereof without departing from the scope of the present disclosure. In addition, many modifications may be made to adapt a particular situation or material to the teachings of the present disclosure without departing from the essential scope thereof. Therefore, it is intended that the present disclosure not be limited to the particular embodiment disclosed as the best mode contemplated for carrying out this present disclosure, but that the present disclosure will include all embodiments falling within the scope of the claims.

What is claimed is:

1. A hybrid electric propulsion system comprising:
a gas turbine engine comprising at least one compressor section and at least one turbine section operably coupled to a shaft;
an electric motor configured to augment rotational power of the shaft of the gas turbine engine; and
a controller operable to:
determine a plurality of hybrid electric propulsion system parameters based on a composite system model and sensor data from one or more sensors;
determine a prediction based on the hybrid electric propulsion system parameters and the composite system model;
determine a model predictive control optimization for a plurality of hybrid electric system control effectors based on the prediction using a plurality of reduced-order partitions of the composite system model, wherein the reduced-order partitions comprise partitions of a propulsion system model comprising a gas turbine engine model, a mechanical power transmission model, and an electrical power system model;
update a plurality of composite system model states of the composite system model based on detection of one or more faults, wherein the reduced-order partitions of the composite system model comprise a plurality of reduced-order partitions of the composite system model states; and
actuate the hybrid electric system control effectors based on the model predictive control optimization.

2. The hybrid electric propulsion system of claim 1, wherein the controller is further configured to update one or more reduced-order values based on the reduced-order partitions of the composite system model states.

3. The hybrid electric propulsion system of claim 2, wherein the one or more reduced-order values are reduced-order Jacobian values based on a plurality of Jacobian equations associated with the composite system model.

4. The hybrid electric propulsion system of claim 3, wherein the reduced-order partitions preserve a plurality of dominant states for each partition.

5. The hybrid electric propulsion system of claim 4, wherein the composite system model comprises the propulsion system model, an optimization objective function, and a plurality of constraints.

6. The hybrid electric propulsion system of claim 5, wherein the Jacobian equations associated with the composite system model comprise a plurality of model sensitivity matrices that are updated based on the detection of one or more faults.

7. The hybrid electric propulsion system of claim 6, wherein the model predictive control optimization uses the model sensitivity matrices to determine a set of changes to the hybrid electric system control effectors that optimizes the optimization objective function over a finite time horizon while maintaining the constraints.

8. The hybrid electric propulsion system of claim 1, further comprising an electric generator configured to extract power from the shaft, wherein the composite system model comprises a plurality of electrical and mechanical physics-based models of at least the gas turbine engine, the electric motor, the electric generator, and one or more mechanical power transmissions.

9. A hybrid electric propulsion system comprising:
a gas turbine engine;
an electrical power system;
a mechanical power transmission operably coupled between the gas turbine engine and the electrical power system;
a plurality of hybrid electric system control effectors operable to control a plurality of states of one or more of the gas turbine engine and the electrical power system; and
a controller configured to control the hybrid electric system control effectors based on a model predictive control that is dynamically updated during operation of the hybrid electric propulsion system, the controller operable to:

determine a plurality of hybrid electric propulsion system parameters based on a composite system model and a plurality of sensor data from one or more sensors;

determine a prediction based on the hybrid electric propulsion system parameters and the composite system model;

determine a model predictive control optimization for the hybrid electric system control effectors based on the prediction using a plurality of reduced-order partitions of the composite system model, wherein the reduced-order partitions comprise partitions of a propulsion system model comprising a gas turbine engine model, a mechanical power transmission model, and an electrical power system model;

update a plurality of composite system model states of the composite system model based on detection of one or more faults, wherein the reduced-order partitions of the composite system model comprise a plurality of reduced-order partitions of the composite system model states; and actuate the hybrid electric system control effectors based on the model predictive control optimization.

10. The hybrid electric propulsion system of claim 9, wherein the controller is further configured to update one or more reduced-order values based on the reduced-order partitions of the composite system model states.

11. The hybrid electric propulsion system of claim 10, wherein the one or more reduced-order values are reduced-order Jacobian values based on a plurality of Jacobian equations associated with the composite system model, and the reduced-order partitions preserve a plurality of dominant states for each partition.

12. The hybrid electric propulsion system of claim 11, wherein the composite system model comprises the propulsion system model, an optimization objective function, and a plurality of constraints, and the Jacobian equations associated with the composite system model comprise a plurality of model sensitivity matrices that are updated based on the detection of one or more faults.

13. The hybrid electric propulsion system of claim 12, wherein the model predictive control optimization uses the model sensitivity matrices to determine a set of changes to the hybrid electric system control effectors that optimizes the optimization objective function over a finite time horizon while maintaining the constraints.

14. The hybrid electric propulsion system of claim 9, wherein the electrical system comprises at least two electric motors, at least two electric generators, and an energy storage system.

15. A method for controlling a hybrid electric propulsion system, the method comprising:

determining, by a controller, a plurality of hybrid electric propulsion system parameters based on a composite system model and a plurality of sensor data from one or more sensors;

determining, by the controller, a prediction based on the hybrid electric propulsion system parameters and the composite system model;

determining, by the controller, a model predictive control optimization for a plurality of hybrid electric system control effectors based on the prediction using a plurality of reduced-order partitions of the composite system model, wherein the reduced-order partitions comprise partitions of a propulsion system model comprising a gas turbine engine model, a mechanical power transmission model, and an electrical power system model;

updating a plurality of composite system model states of the composite system model based on detection of one or more faults, wherein the reduced-order partitions of the composite system model comprise a plurality of reduced-order partitions of the composite system model states; and actuating, by the controller, the hybrid electric system control effectors based on the model predictive control optimization.

16. The method of claim 15, further comprising:

updating one or more reduced-order values based on the reduced-order partitions of the composite system model states.

17. The method of claim 16, wherein the one or more reduced-order values are reduced-order Jacobian values based on a plurality of Jacobian equations associated with the composite system model, and the reduced-order partitions preserve a plurality of dominant states for each partition.

18. The method of claim 17, wherein the composite system model comprises the propulsion system model, an optimization objective function, and a plurality of constraints, and the Jacobian equations associated with the composite system model comprise a plurality of model sensitivity matrices that are updated based on the detection of one or more faults, wherein the model predictive control optimization uses the model sensitivity matrices to determine a set of changes to the hybrid electric system control effectors that optimizes the optimization objective function over a finite time horizon while maintaining the constraints.

* * * * *